(12) United States Patent
Gardner et al.

(10) Patent No.: US 9,890,847 B2
(45) Date of Patent: Feb. 13, 2018

(54) ANTI-SIPHON ARRANGEMENT FOR HYDRAULIC SYSTEMS

(71) Applicant: DEERE & COMPANY, Moline, IL (US)

(72) Inventors: Michael L. Gardner, Ankeny, IA (US); Paul D. Marvin, Dewitt, IA (US)

(73) Assignee: Deere & Company, Moline, IL (US)

( * ) Notice: Subject to any disclaimer, the term of this patent is extended or adjusted under 35 U.S.C. 154(b) by 211 days.

(21) Appl. No.: 14/701,339

(22) Filed: Apr. 30, 2015

(65) Prior Publication Data

US 2016/0319976 A1 Nov. 3, 2016

(51) Int. Cl.
| | | |
|---|---|---|
| F16H 57/04 | (2010.01) | |
| F15B 1/26 | (2006.01) | |
| F15B 20/00 | (2006.01) | |
| F15B 21/04 | (2006.01) | |
| E02F 9/22 | (2006.01) | |
| F01M 1/12 | (2006.01) | |
| F16H 57/02 | (2012.01) | |

(52) U.S. Cl.
CPC ..... *F16H 57/0436* (2013.01); *F16H 57/0435* (2013.01); *F16H 57/0452* (2013.01); *E02F 9/226* (2013.01); *F01M 2001/123* (2013.01); *F15B 1/26* (2013.01); *F15B 20/005* (2013.01); *F15B 21/044* (2013.01); *F16H 2057/02056* (2013.01)

(58) Field of Classification Search
CPC ......... Y10T 137/3294; Y10T 137/3331; Y10T 137/3258; Y10T 137/3149; Y10T 137/86187; Y10T 137/86196; Y10T 137/86364; Y10T 137/86131; Y10T 137/86163; Y10T 137/86139; F16H 57/0436; F16H 57/0435; F16H 57/0452; F16H 2057/02056
See application file for complete search history.

(56) References Cited

U.S. PATENT DOCUMENTS

| | | | | |
|---|---|---|---|---|
| 204,135 | A * | 5/1878 | Convery | E03C 1/295 137/216.2 |
| 321,829 | A * | 7/1885 | MacKley et al. | E03C 1/295 137/216.2 |
| 1,435,396 | A * | 11/1922 | Howland | F01B 25/00 137/217 |
| 3,145,724 | A * | 8/1964 | Pelzer | E03C 1/108 137/217 |
| 3,329,165 | A * | 7/1967 | Lang | F15B 13/0405 137/625.5 |
| 3,763,887 | A | 10/1973 | MacVey et al. | |
| 4,611,631 | A * | 9/1986 | Kosugi | F16K 31/0627 137/625.27 |

(Continued)

*Primary Examiner* — Craig Schneider
*Assistant Examiner* — Frederick D Soski
(74) *Attorney, Agent, or Firm* — Taft Stettinius & Hollister LLP; Stephen F. Rost

(57) ABSTRACT

An anti-siphon arrangement for a hydraulic system with a reservoir includes first and second flow paths providing hydraulic communication between the reservoir and a lower area. Each flow path includes an anti-siphon portion extending at least partly above a fluid level of the reservoir. First and second valves are configured, when configured in open states, to allow gas to flow from a gas source to the anti-siphon portions of the first and second flow paths, respectively.

18 Claims, 5 Drawing Sheets

(56) References Cited

U.S. PATENT DOCUMENTS

| | | | | |
|---|---|---|---|---|
| 4,708,162 A | * | 11/1987 | Bayat | A01G 25/162 137/382 |
| 4,915,134 A | * | 4/1990 | Toliusis | F16K 11/044 137/625.27 |
| 5,168,855 A | * | 12/1992 | Stone | F02M 57/025 123/446 |
| 5,215,164 A | | 6/1993 | Shibata | |
| 5,404,898 A | * | 4/1995 | Stowers | F16K 24/02 137/217 |
| 5,485,895 A | * | 1/1996 | Peterson | F01M 1/12 184/104.1 |
| 5,599,100 A | * | 2/1997 | Jackson | C10M 177/00 184/6 |
| 5,918,558 A | * | 7/1999 | Susag | F15B 11/162 111/200 |
| 5,957,155 A | * | 9/1999 | Lovejoy | B05B 15/00 137/356 |
| 6,439,939 B1 | * | 8/2002 | Jaeger | F01N 13/004 137/217 |
| 6,745,565 B1 | * | 6/2004 | Wahner | F15B 1/26 220/367.1 |
| 8,375,917 B1 | * | 2/2013 | Neal | F01M 5/002 123/196 A |
| 9,316,307 B2 | * | 4/2016 | Wi | F16H 61/0031 |
| 9,464,711 B2 | * | 10/2016 | Lee | F16H 61/0025 |
| 2003/0222457 A1 | * | 12/2003 | Satou | F24F 5/0007 290/2 |
| 2010/0051123 A1 | * | 3/2010 | Wiens | F15B 1/26 137/565.01 |
| 2013/0098452 A1 | * | 4/2013 | Maurer | F15B 11/17 137/1 |
| 2014/0060680 A1 | * | 3/2014 | Hwang | F04C 23/001 137/565.3 |
| 2014/0060681 A1 | * | 3/2014 | Hwang | F16H 61/38 137/565.3 |
| 2014/0096852 A1 | * | 4/2014 | Wi | F16H 61/0025 137/565.3 |
| 2015/0027570 A1 | * | 1/2015 | Wi | F16H 61/0021 137/563 |
| 2015/0053505 A1 | * | 2/2015 | Klowak | F01M 11/061 184/105.1 |
| 2015/0167833 A1 | * | 6/2015 | Jo | F16H 61/0025 137/565.14 |
| 2015/0247511 A1 | * | 9/2015 | Barr | F15B 1/26 60/327 |
| 2016/0215927 A1 | * | 7/2016 | Nelson | F04B 23/02 |
| 2016/0242326 A1 | * | 8/2016 | Edwards | H05K 7/20781 |

\* cited by examiner

ANTI-SIPHON ARRANGEMENT FOR HYDRAULIC SYSTEMS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to arrangements for blocking siphoning or leakage flow in hydraulic systems, including lubrication, cooling, and charge systems for work vehicles.

BACKGROUND OF THE DISCLOSURE

In hydraulic systems, a reservoir of fluid is sometimes placed in hydraulic communication with an area of relatively lower elevation. This may be useful, for example, to lubricate, cool, control, or charge components of a vehicle drive train with oil from a sump that is disposed at a higher elevation than the components to be lubricated or cooled. Configurations with elevated reservoirs, however, may suffer from siphoning or leakage of fluid out of the reservoirs. Among other issues, this can result in reduced fluid levels in the reservoirs, which may be detrimental to system performance. For example, in lubrication systems for vehicle transmissions, excessive siphoning of oil from a main sump may require a delay in starting the vehicle or engaging the transmission until the sump has been adequately primed or may result in increased parasitic loads due to a dry sump being filled with siphoned or leaked oil.

In known systems, loss of fluid from elevated reservoirs is sometimes counteracted by pumps moving fluid actively from lower areas to the reservoirs. Due to unavoidable leakage, however, siphoning may still cause the reservoirs to lose fluid, in aggregate, when the pumps are not active.

For these and other reasons, it may be useful to provide an arrangement to prevent siphoning or leakage of fluid from an elevated reservoir.

SUMMARY OF THE DISCLOSURE

An anti-siphon arrangement for a hydraulic system is disclosed, in order to prevent siphoning of fluid from an elevated reservoir.

According to one aspect of the disclosure, an anti-siphon arrangement may include first and second flow paths providing hydraulic communication between a reservoir and at least one area below an oil level of the reservoir. Each of the two flow paths may include an anti-siphon portion extending at least partly above the oil level of the reservoir. First and second valves may be configured, when open, to allow gas to flow from at least one gas source to the respective first and second anti-siphon portions of the two flow paths. Opening the first and second valves may accordingly prevent siphoning of fluid from the first reservoir to the area through, respectively, the first and second flow paths.

According to another aspect of the disclosure, a hydraulic manifold to prevent siphoning may include a manifold body configured to be mounted at least partly above a fluid level of a reservoir. Two valved arrangement may be included in the manifold body, each including an intersection joining three flow paths, and a valve may be arranged to controllably block flow between the intersection and a gas source.

According to still another aspect of the disclosure, a hydraulic system may include a charge flow path and a scavenge flow path, each extending between an oil sump and a transmission case. Each of the flow paths may include an anti-siphon bend extending at least partly above an oil level of the oil sump. A charge pump may be configured to pump oil from the oil sump to the transmission case, and a scavenge pump may be configured to pump oil from the transmission case to the oil sump. An anti-siphon valve arrangement may include a first valve in hydraulic communication with a gas source and a first of the anti-siphon bends, such that opening the valve allows gas to flow from the gas source to the first bend. The anti-siphon valve arrangement may further include a second valve in hydraulic communication with the gas source and a second of the anti-siphon bends, such that opening the valve allows gas to flow from the gas source to the second bend.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
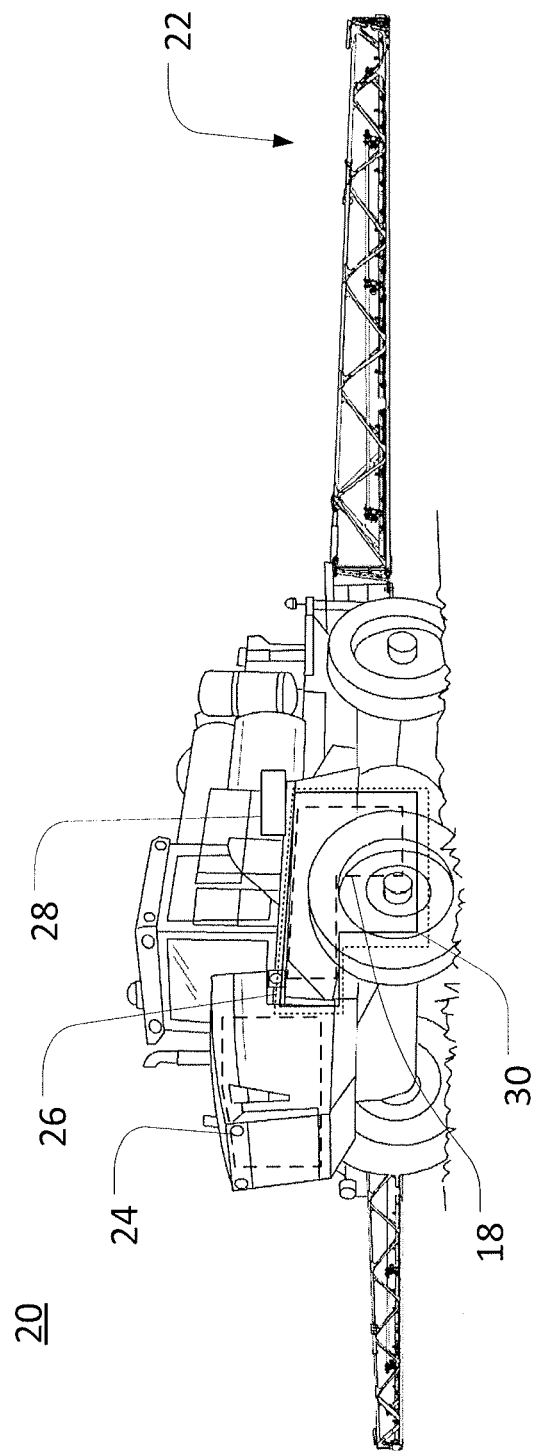
FIG. 1 is a simplified perspective view of an example vehicle including a hydraulic system with an anti-siphon arrangement.

The following describes one or more example embodiments of the disclosed anti-siphon arrangement, as shown in the accompanying figures of the drawings described briefly above. Various modifications to the example embodiments may be contemplated by one of skill in the art.

As used herein, a "reservoir" may refer to an area that is sufficiently bounded for fluid to accumulate. A "reservoir" may include, for example, tanks and other containers, enclosed or open sumps or catchment areas, partially bounded areas in cases or housings, and so on.

Also as used herein, a "flow path" may be viewed as an arrangement of one or more components to provide fluid communication between two areas. A flow path may sometimes include one or more flow lines (e.g., flexible hoses, piping, channels, and so on) to transmit pressurized fluid over a distance. Some flow paths may include one or more pumps, manually and automatically controlled valve assemblies, filters or other hydraulic components, sensors of various configurations (e.g., flow sensors or temperature sensors for the fluid contained by the flow path), and so on.

Also as used herein, a "hydraulic" system may include any system for the movement of fluid in an at least partly confined space under natural or applied pressure. Likewise, other words modified by "hydraulic" may be viewed as relating to such a system.

Also as used herein, a "bend" may refer to a change in direction along a flow path, including curved, angled, and other changes in direction. A bend may be included in a single flow line, as part of an intersection between flow lines, or may be embodied in various other ways.

In some embodiments, the anti-siphon arrangements disclosed herein can prevent siphoning of fluid from an elevated reservoir of a hydraulic system to a lower area. For example, in a hydraulic system of a work vehicle, the disclosed arrangement, and systems employing it, can block siphoning of fluid from an elevated sump to a transmission case at a lower elevation. Such an arrangement, and others, may usefully prevent delays in start-up of hydraulically cooled, charged, controlled, or lubricated systems, by reducing or eliminating the need to prime a sump before operation or to evacuate a dry sump before checking a reservoir sight gauge or starting operation.

In an anti-siphon arrangement, as disclosed herein, multiple flow paths extend between a fluid reservoir and one or more areas disposed below a fluid level of the reservoir. Generally, the multiple flow paths of the disclosed arrangement may include one or more flow lines, and may be arranged in various ways, including in parallel, in series, overlapping in parts.

In some embodiments, different types of equipment may be included along the flow paths. For example, in a lubrication or cooling system, a first flow path may include a charge pump and associated flow lines through which the charge pump moves fluid away from a sump. A second flow path may include a scavenge pump and associated flow lines through which the charge pump moves fluid toward the sump from a lower area.

To help prevent siphoning from the fluid reservoir, each of the plurality of flow paths includes an anti-siphon portion extending above a fluid level of the fluid reservoir. In some embodiments, anti-siphon portions of a flow line may include bends in continuous flow lines, or intersections of different flow lines, that are at least partly above a target fluid level for an associated reservoir. In some embodiments, such bends or intersections may be included in (e.g., manufactured into) a manifold and attached thereby to appropriate points on a vehicle (e.g., at a fluid reservoir) or in other systems.

To provide control over anti-siphoning effects, the disclosed arrangement includes at least two valves, each configured, when opened, to allow gas to flow into the anti-siphon portion of the associated flow path. Different types of valves may be used, including biased valves, piloted or electro-mechanically actuated valves, manually operated valves, and so on. The valves may be controlled in various ways, including via pressure applied by a pumped flow, via electronic or hydraulic signals, and so on.

In some embodiments, biased check valves may be disposed between a gas source and the anti-siphon portions of each flow path of the disclosed arrangement. In this way, for example, pressure from pumped flow along the flow lines may tend to close the valves, thereby preventing flow of gas into the anti-siphon portion. Gravity may then act to open the valves when the pressure of the flow drops (e.g., when a relevant pump ceases to operate).

In some embodiments, a manufactured manifold may be configured to hold the valves for an anti-siphon arrangement in various ways. Such a manifold may include various inlet and outlet ports, embedded flow paths (e.g., manufacture internal channels), valve ports (e.g., threaded holes to receive threaded valve bodies), and mounting equipment (e.g., holes, catches, tabs, slots, threaded surfaces, and so on).

Embodiments of the disclosed arrangement may be useful in various hydraulic systems, including hydraulic systems of work vehicles. In some embodiments, the disclosed arrangement may be used with a sprayer or a nutrient application vehicle, such as a dry nutrient spinner or a dry nutrient air boom vehicle. Referring to FIG. 1, for example, a work vehicle may be configured as a sprayer 20, with a spray boom 22 for delivering various substances. The sprayer 20 may be driven by an engine 24 via a transmission 26, which may be lubricated or cooled by a hydraulic system 30. To prevent unwanted siphoning of fluid within the hydraulic system 30, an anti-siphon arrangement 18 may be used. It will be understood that FIG. 1 depicts example boundaries of the transmission 26, anti-siphon arrangement 18, and hydraulic system 30. In other embodiments, these systems (and others) may be configured with different boundaries, or in different locations on the sprayer 20 (or another vehicle).

In some arrangements, a controller 28 (e.g., a programmable circuit, processor and memory, hydraulic controller, etc.) may be configured to receive input from various sensors or other devices (not shown) and to output various control signals (e.g., electrical or hydraulic signals). The controller 28 may be in communication with various components within the anti-siphon arrangement 18, including to control aspects of operation of the arrangement 18 via control signals.

Figure 2A:
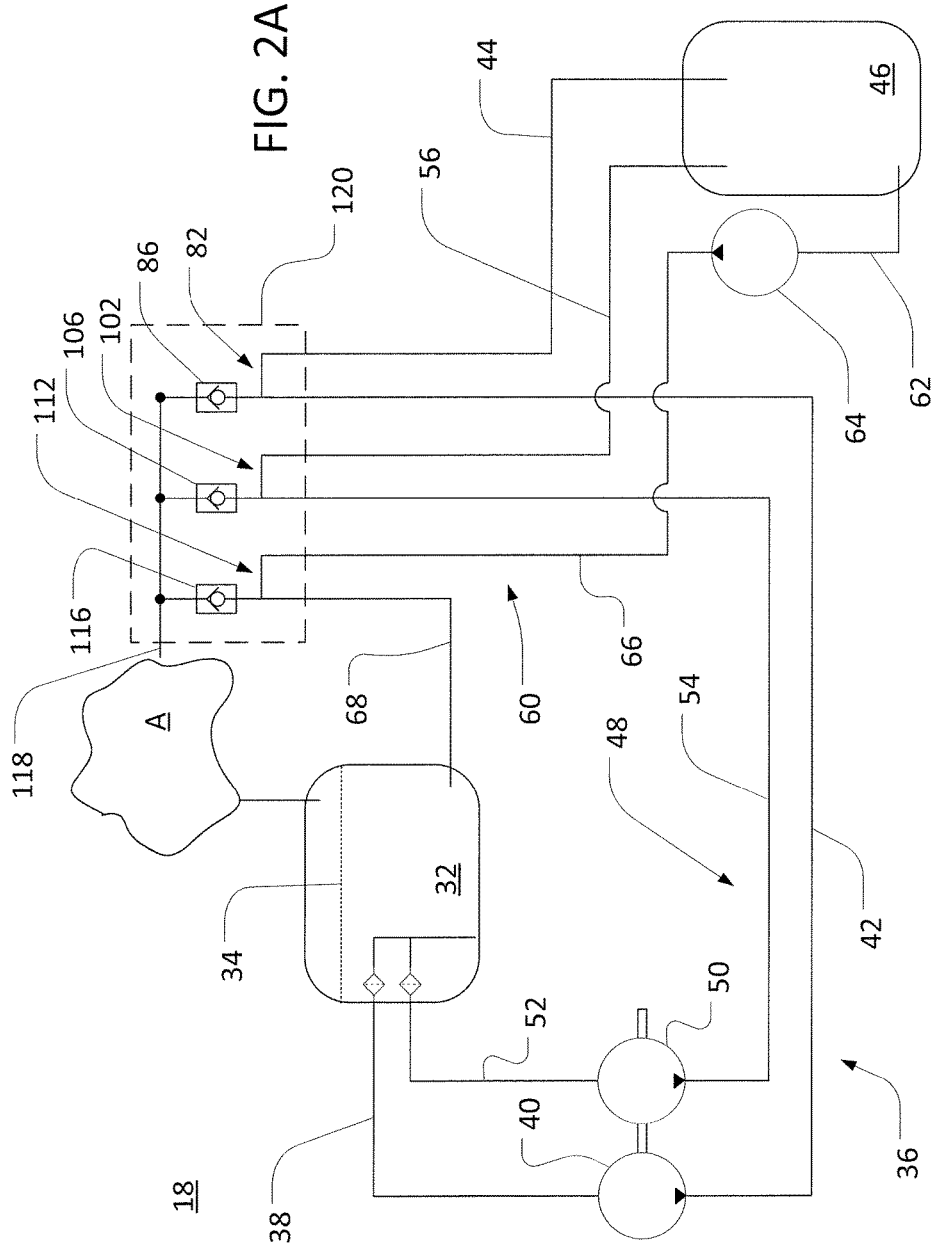
FIG. 2A is a schematic view of the hydraulic system and anti-siphon arrangement of FIG. 1.

Referring also to FIG. 2A, in some embodiments the hydraulic system 30 includes an elevated reservoir configured as oil sump 32 (e.g., disposed generally behind an operator station of the sprayer 20), with a target oil level 34. The target oil level 34 may be a level (or range of levels) that represent a target oil level for operation the sump 32, a fill level (or range of levels) for the sump 32, an expected operating level (or range of levels), and so on. In some embodiments, the elevation of the target oil level 34 may change over time, during particular operations of the sprayer 20, for particular orientations of the sprayer 20 (e.g., degrees of tilt or roll), and so on.

Multiple flow paths extend from the sump 32 to areas that are lower in elevation than the target oil level 34. For example, a flow path 36 includes a flow line 38 extending from the sump 32 to a charge pump 40. During operation, the charge pump 40 moves oil from the sump 32, via the flow line 38, through flow lines 42 and 44 to a transmission case 46 (e.g., a transmission case for an axle arrangement, disposed between front and rear wheels of the sprayer 20) or other location (e.g., hydraulic controls, other sumps, hydraulic actuators, and so on). In some embodiments, a similar flow path 48 may be similarly configured, with a charge pump 50 moving oil from the sump 32, via flow lines 52, 54, and 56 to the transmission case 46 (or another location). In the system 30, another flow path 60 includes a flow line 62 extending from the transmission case 46 to a scavenge pump 64, which then pumps oil, via flow lines 66 and 68 to the sump 32.

In some embodiments, the flow line 68 (or other flow lines) may not be included. For example, as also discussed below, a manifold for the disclosed system may be mounted directly to a wall of the sump 32, such that an outlet port from the manifold for a particular flow path (e.g., the flow path 60) may directly port fluid from the manifold into the sump 32, without the need for certain intervening flow path components such as flow lines or fittings. For example, when such a manifold is mounted to the sump 32, an outlet (e.g. outlet port) from the manifold along the flow path 60 may be aligned with a port (not shown) into the sump 32, such that fluid from the flow path 60 may flow directly into sump 32 without the need for intervening hoses (or other flow lines).

To block siphoning of oil from the sump 32 to the transmission case 46, respective portions of the flow paths 36, 48, and 60 may include, or be included in, respective anti-siphon arrangements. As depicted, for example, each of the flow paths 36, 48, and 60 includes an anti-siphon portion extending at least partly above the target oil level 34. An anti-siphon portion may generally include a bend in a flow line, an intersection of flow lines, or similar other features, and may be in communication with (or included in) a valved arrangement.

Figure 2B:
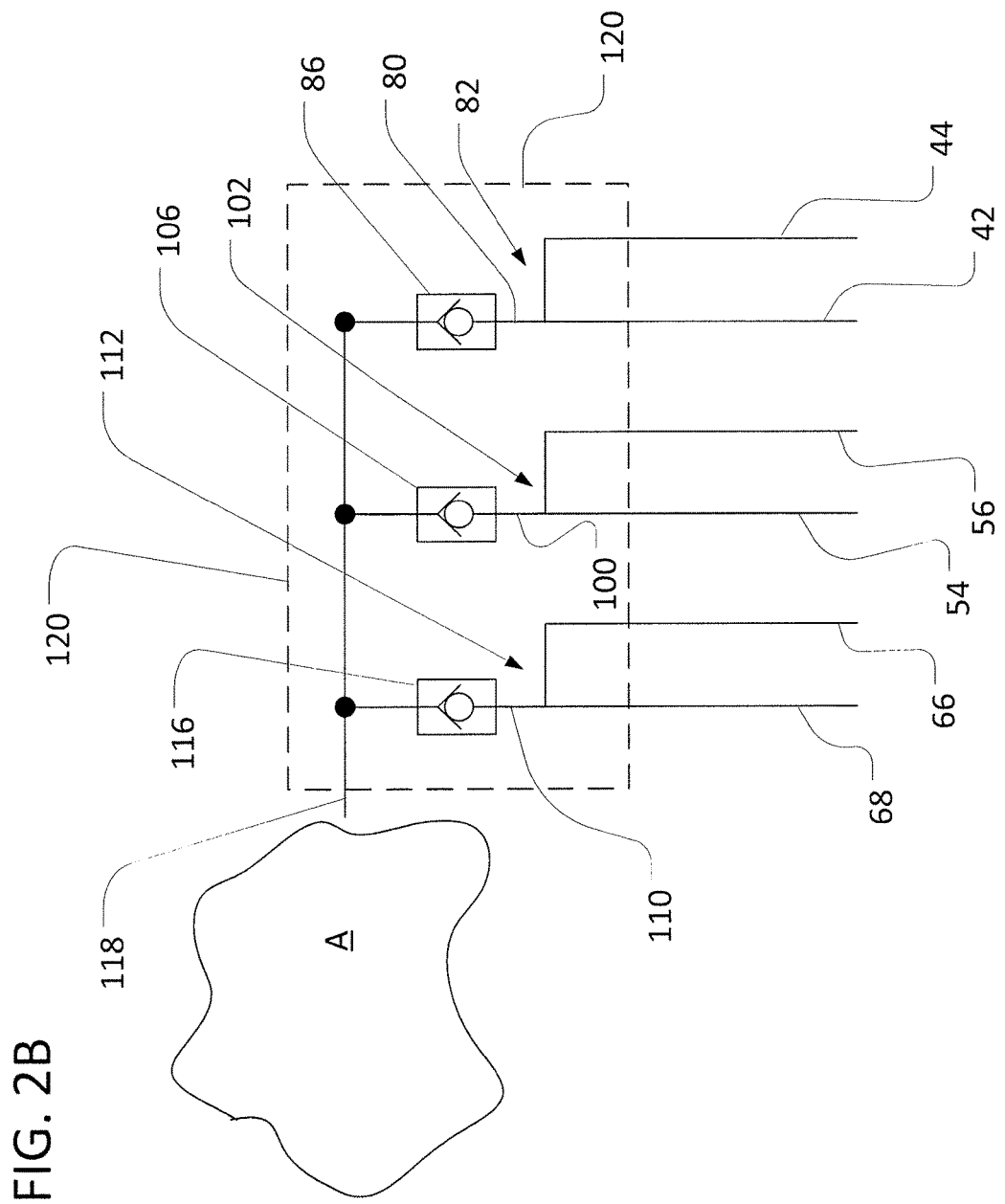
FIG. 2B is an enlarged view of part of the hydraulic system of FIG. 2A, including anti-siphon portions of various flow paths.

Referring also to FIG. 2B, in the embodiment depicted, the flow lines 42 and 44 and a flow line 80 meet at an intersection 82 that is above the oil level 34, with the intersection 82 providing an anti-siphon bend in the flow path 36. The flow line 80 provides a connection between the intersection 82 and atmosphere (denoted as "A") or another gas source. A check valve 86 is disposed along the flow line 80, such that pressurized flow from the pump 40 closes the check valve 86 and prevents flow of oil along the flow line 80, as well as flow of air from the atmosphere A to the intersection 82. When the oil pressure at the intersection falls, however, the check valve 86 opens and air moves through the intersection 82 and into both of the flow lines 42 and 44. As oil columns in communication with the intersection 82 (e.g., fluid columns along the flow lines 42 and 44) leak downward, or the oil contracts from cooling, this air breaks the hydraulic connection between the sump 32 and the transmission case 46 along the flow lines 42 and 44, such that a siphon flow may not form.

Similarly, the flow lines 54 and 56 and a flow line 100 meet at an intersection 102 that is above the oil level 34, with the intersection 102 providing an anti-siphon bend in the flow path 48. The flow line 100 provides a connection between the intersection 102 and the atmosphere A or another gas source. A check valve 106 is disposed along the flow line 100, such that pressurized flow from the pump 40 closes the check valve 106 and prevents flow of oil along the flow line 100, as well as flow of air from the atmosphere A to the intersection 102. When the oil pressure at the intersection falls, however, the check valve 106 opens and air moves through the intersection 102 and into both of the flow lines 54 and 56. As oil columns in communication with the intersection 102 (e.g., fluid columns along the flow lines 54 and 56) leak downward, or the oil contracts from cooling, this air breaks the hydraulic connection between the sump 32 and the transmission case 46 along the flow lines 54 and 56, such that a siphon flow may not form.

A similar arrangement is used for the scavenge flow path 60, with the flow lines 66 and 68 and a flow line 110 meeting at an intersection 112 that is above the oil level 34, with the intersection 112 providing an anti-siphon bend in the flow path 60. A check valve 116 along the flow line 110 blocks flow from the scavenge pump 64 to the atmosphere A (and from the atmosphere A to the intersection 112), when the scavenge pump 64 operates. When the oil pressure at the intersection 112 drops, however, the check valve 116 opens and air moves through the intersection 112 and into both of the flow lines 66 and 68 to prevent siphoning.

As depicted, the various intersections 82, 102, and 112 vent to the atmosphere A via a common gas port 118 that is disposed outside of the sump 32. In some embodiments, multiple gas ports (not shown) may be used to vent the different intersections 82, 102, and 112 or various combinations thereof. Likewise, in some embodiments, the gas port 118 (or another gas port) may be disposed inside the sump 32 (e.g., above the oil level 34). In some embodiments, as also noted above, a manifold for the disclosed system may be mounted directly to a wall of the sump 32. In some embodiments, the gas port 118 may directly port gas from such a manifold into the sump 32 (or vice versa), without the need for certain intervening flow path components such as flow lines or fittings. For example, when the manifold is mounted to the sump 32, the gas port 118 may be aligned with a port (not shown) into the sump 32, such that atmospheric gas from the sump 32 may flow directly into the gas port 118 without the need for intervening hoses.

As depicted, the check valves 86, 106, and 116 are gravity-biased valves and, accordingly, are oriented to block upward flow of oil, when closed. When oil pressure in the intersections 82, 102, and 112 drops sufficiently, gravity opens the valves 86, 106, and 116, respectively, allowing air to move into the flow paths 36, 48, and 60. This may provide a relatively efficient and reliable form of control over the anti-siphon effects of the system 30.

In other embodiments, other valved arrangements or other configurations of the valves 86, 106, and 116 may be utilized. In some embodiments, for example, valves 86, 106, and 116 may be oriented in other ways or replaced with other types of valves. In some embodiments, spring-biased check valves (e.g., with a pressurized gas supply for control) or electro-hydraulic poppet valves may be used. In some embodiments, electro-hydraulic poppet (or other) valves may be configured to be open when the engine 24 is not operating, then powered closed at the start of the engine 24. This may be useful, for example, to help prime charge pumps during factory start-up or after maintenance operations. Further, when the valves are opened, this may allow oil to bypass areas of a transmission in lieu of a relatively direct path to a reservoir, thereby helping to ensure adequate pump priming and oil flow at low pressures. This may, in turn, help to prevent dry starts for charge pumps and to generally bleed away unwanted air. In some embodiments, electro-hydraulic poppet (or other) valves may be configured to remain open for some time after the start of the engine 24. This may be useful, for example, to reduce parasitic loads in cold starts, with charge pumps pushing oil directly to a reservoir, rather than operating to build system pressure during engine cranking or after an engine start.

In some embodiments, an electronic or hydraulic controller may be configured to open and close controllable valves based on various factors. For example, the controller 28 (see FIG. 1), may be configured to open valves based upon signals from the pumps 40, 50, or 64, from various sensors (e.g., a flow sensor, temperature sensor, or fluid level sensor), based upon operator commands or settings, based on the current state of the engine 24, and so on.

In some embodiments, various combinations of the intersections 82, 102, and 112 (or similar other features of the flow paths 36, 48, and 60) and the check valves 86, 106, and 116 (or other valves) may be disposed at other locations with respect to the sump 32. For example, the different intersections 82, 102, and 112 and valves 86, 106, and 116, may be distributed around the sump 32, or may be mounted, together or separately, at various other locations.

As depicted, the arrangement of the intersections 82, 102, and 112 and the valves 86, 106, and 116 are included or received in a manifold 120 that is mounted to the sump 32 at least partly above the oil level 34. This may be useful, for example, to reduce the required length or number of hoses or other flow lines, or to generally eliminate potential failure points (e.g., leak or rupture points). In some embodiments, the manifold 120 may be mounted at other locations, provided that an anti-siphon portion of the flow paths 36, 48, and 60 is disposed at least partly above the oil level 34.

Figure 3A:
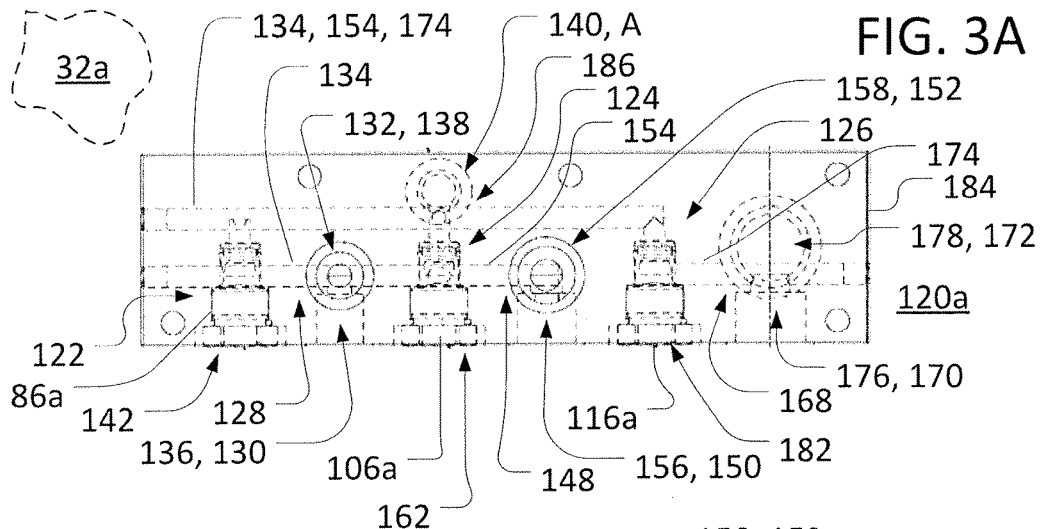
FIGS. 3A, 3B and 3C are perspective views, from a front, bottom, and rear perspective, respectively, of a manifold for use with the hydraulic system of FIGS. 1 and 2.
Figure 3B:
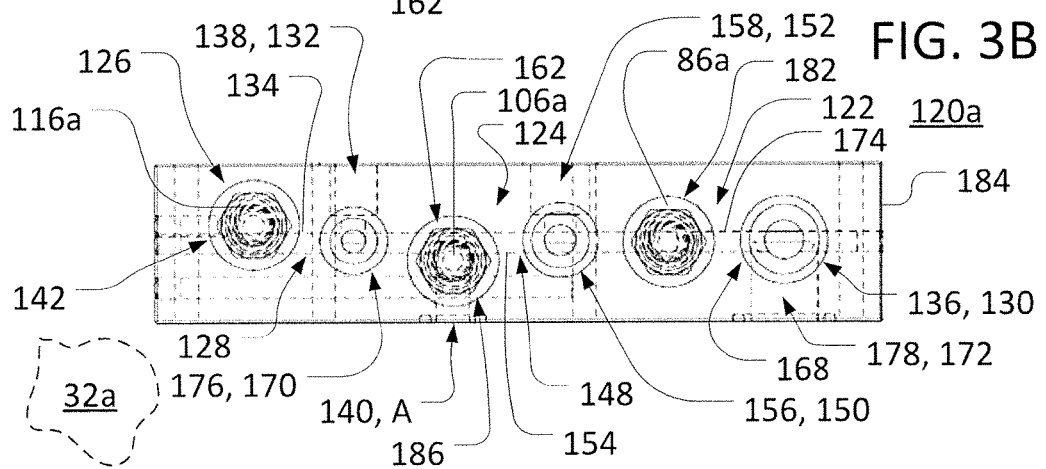
Figure 3C:
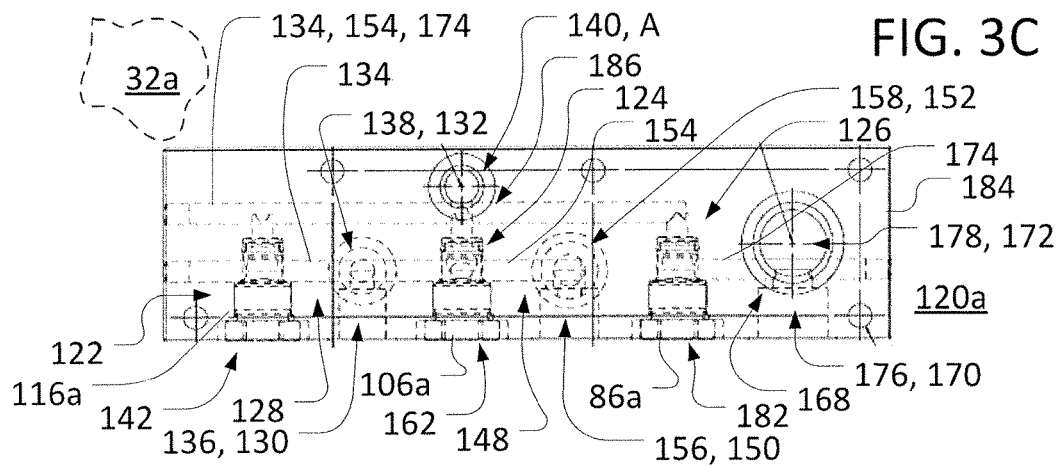

Referring also to FIGS. 3A through 3C, an example configuration of the manifold 120 is depicted as manifold 120a. As depicted, the manifold 120a is configured to mount to a case 32a for the oil sump 32 (see FIG. 2A). It will be understood, however, that other mounting locations and configurations are possible.

The manifold 120a is configured to include three anti-siphon valved arrangements 122, 124, and 126. In an arrangement similar to that of FIG. 2, the valved arrangements 122 and 124 are included in flow paths for pumping fluid (e.g., with the charge pumps 40 or 50) from an elevated reservoir to a lower area, and the valved arrangement 126 is included in a flow path for pumping fluid (e.g., with the scavenge pump 64) from a lower area to an elevated reservoir. In other embodiments, other configurations are possible. For example, each of the valved arrangements 122, 124, and 126 may be included in flow paths for pumping fluid to a lower area, the valved arrangements 122 and 124 may be included in flow paths for pumping fluid to an elevated reservoir, or all of the valved arrangements 122, 124, and 126 may be included in a flow path for pumping fluid to an elevated reservoir.

The valved arrangement 122 includes an intersection 128 joining separate flow paths 130, 132, and 134. The flow path 130 extends from the intersection 128 to an inlet port 136, the flow path 132 extends from the intersection 128 to an outlet port 138, and the flow path 134 extends from the intersection to a valve port 142 (shown with a check valve 86a installed) and then to a gas port 140 to the atmosphere A. Similarly, the valved arrangement 124 includes an intersection 148 joining separate flow paths 150, 152, and 154. The flow path 150 extends from the intersection 148 to an inlet port 156, the flow path 152 extends from the intersection 148 to an outlet port 158, and the flow path 154 extends from the intersection 148 to a valve port 162 (shown with a check valve 106a installed) and then to the atmosphere A. Finally, the valved arrangement 126 includes an intersection 168 joining separate flow paths 170, 172, and 174. The flow path 170 extends from the intersection 168 to an inlet port 176, the flow path 172 extends from the intersection 168 to an outlet port 178, and the flow path 174 extends from the intersection 168 to a valve port 182 (shown with a check valve 116a installed) and then to the atmosphere A.

Valves, such as the gravity-biased check valves 86a, 106a, and 116a, may be installed into the valve ports 142, 162, and 182 (e.g., screwed into threaded surfaces in the valve ports 142, 162, and 182), in order to controllably open and close flow paths from the intersections 128, 148, and 168 to the atmosphere A. In the configuration depicted, the valves 86, 106 and 116 may close when sufficiently pressurized fluid is received, respectively, at the inlet ports 136, 156, and 176, and may otherwise open to vent intersections 128, 148, and 168 to the atmosphere A. In this way, for example, the manifold 120a may operate to break existing siphons, and to prevent siphon formation, when the valves 86, 106, and 116 are open.

As depicted, the flow paths 134, 154, and 174 meet at an intersection 186, such that gas may flow to each of the intersections 122, 124 and 126 via a single gas port 140. In other embodiments, other configurations may be possible. For example, separate gas ports (not shown) may be provided for flow of gas to each of the intersections 122, 124, and 126, or various combinations thereof.

Also as depicted, the various flow paths 130, 132, 134, 150, 152, 154, 170, 172, and 174 are configured as channels manufactured into a block 184 of the manifold 120a, with various plugs (not shown) serving to close flow paths that would otherwise result from the manufacturing process. (e.g, flow paths extending along an entire pilot hole or other manufacturing bore). In other embodiments, these and other flow paths may be configured (and formed) in various other ways.

In some embodiments, the manifold 120a may be mounted to a reservoir such as the oil sump 32, in order to prevent siphoning. For example, the inlet ports 136 and 156 may be connected by one or more flow paths to the sump 32 and the outlet ports 138 and 158 may be connected by one or more flow paths to a lower area. The inlet port 176 may be connected by a flow path to a lower area and the outlet port 178 may be connected by a flow path to the sump 32. Pumps (e.g., the charge pumps 40 or 50 and the scavenge pump 64, or similar other pumps) may be configured to pump oil along the various flow paths from the sump 32 to the inlet ports 136 and 156, and from the lower area to the inlet port 176. In such a configuration, the manifold 120a may accordingly prevent siphoning from the sump 32 to the lower area when various pumps (e.g., the pumps 40, 50, and 64) are not operating.

As depicted, the outlet ports 138 and 158 are disposed on one side of the block 184 and the outlet port 178 and the gas port 140 are disposed on an opposite side of the block 184. This may be useful, for example, in order to route the flow paths 172 directly into the case 32a of the sump 32 (e.g., without intervening flow lines, fittings, and so on). For example, the manifold 140a may be mounted directly to the case 32a, such that one or more of the gas port 140 and the outlet port 178 are disposed flush against a wall of the case 32a. Likewise, this may allow the gas port 140 open directly into the case 32a (above the oil level 34). Flow lines (e.g., hoses) may then be routed away from the case 32a from the outlet ports 138 and 158. An o-ring (not shown) or similar seal may be disposed in a groove at the outlet port 178 in order to provide an appropriate seal with the case 32a. Likewise, other o-rings (not shown) or similar seals may be disposed in other grooves at the other ports 138, 158, and 140, as appropriate.

Various other configurations are possible. For example, various combinations of the inlet ports 136, 156, and 176 and outlet ports 138, 158, and 178 may alternatively be configured as outlet ports and inlet ports, respectively. Likewise, although, the depicted valve ports 142, 162, and 182 collectively vent to the atmosphere A at the single gas port 140, other configurations may include multiple vents to the atmosphere A, or to other gas sources. Further, the routing and geometry of the various internal channels of the manifold 120a may be altered in various ways.

Figure 4:
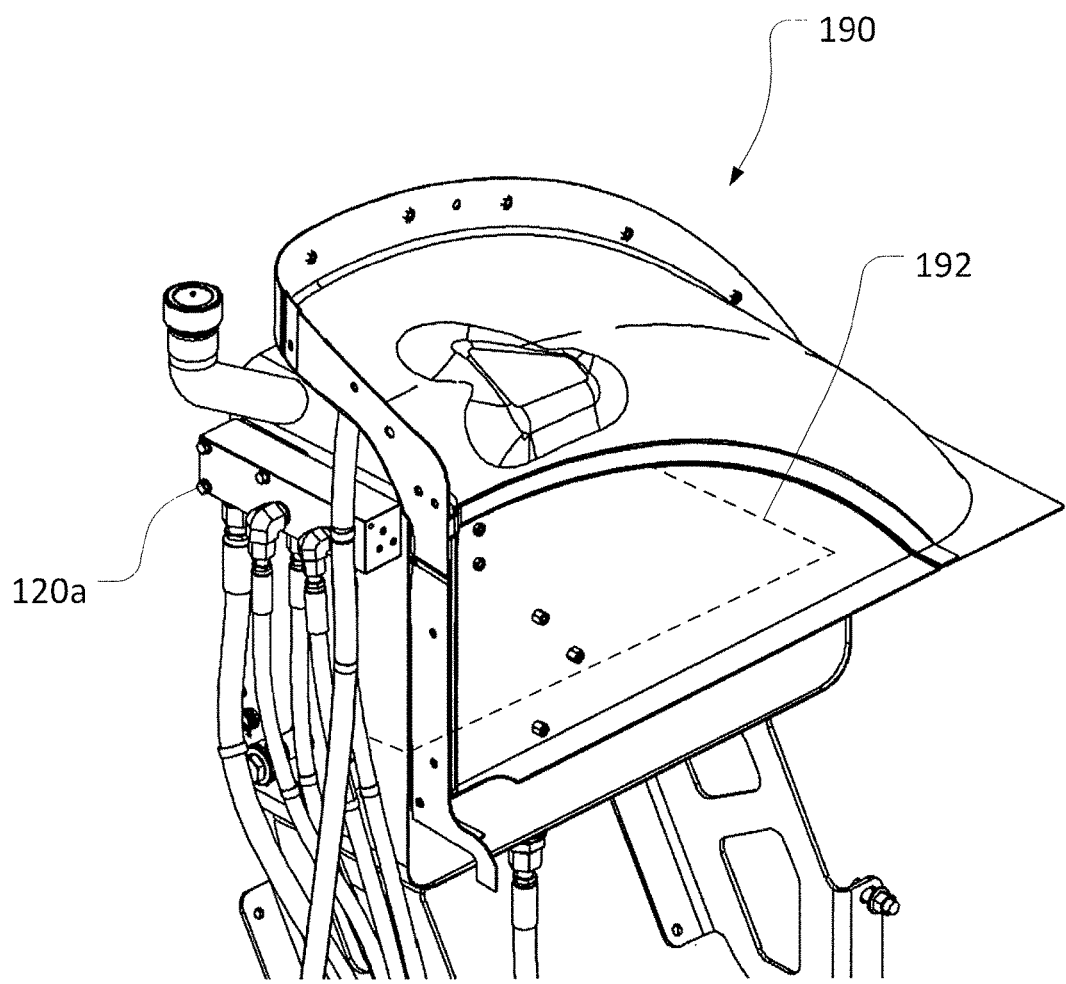
FIG. 4 is a perspective view of the manifold of FIGS. 3A through 3C mounted to a wall of a fluid reservoir.

Referring also to FIG. 4, an example mounting location for the manifold 120a is depicted for a reservoir configured as an oil sump 190 with a nominal oil level 192. It can be seen from FIG. 4, as also generally described above, the manifold 120a may be mounted to a wall of the oil sump 190 such that the manifold 120a (and the flow path intersections 128, 148, and 168 therein) are disposed generally above the oil level 192. In this way, a relatively compact configuration may be provided, with direct (e.g., hose-less) connections between certain flow lines of the manifold 120a and the interior of the oil sump 190. In some embodiments, as also described with respect to FIGS. 3A through 3C, such direct connections may be provided at an outlet port of a scavenge flow path and at a port to atmosphere for each of the various intersections of the manifold 120a. In other embodiments, such direct connections may additionally (or alternatively) be provided at other ports of the manifold 120a.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An anti-siphon arrangement for a hydraulic system including a reservoir, the anti-siphon arrangement comprising:
    a first flow path that provides hydraulic communication between the reservoir and an area disposed at least partly at an elevation below a fluid level of the reservoir, the first flow path including a first anti-siphon portion extending at least partly above the fluid level of the reservoir;
    a second flow path that provides hydraulic communication between the reservoir and the area, the second flow path including a second anti-siphon portion extending at least partly above the fluid level of the reservoir;
    a first valve configured to enter an open state based on fluid pressure in the first anti-siphon portion of the first flow path regardless of fluid level in the second anti-siphon portion of the second flow path and, when in the open state, to allow gas to flow from at least one gas source to the first anti-siphon portion of the first flow path; and
    a second valve configured to enter an open state based on fluid pressure in the second anti-siphon portion of the second flow path regardless of fluid level in the first anti-siphon portion of the first flow path and, when in the open state, to allow gas to flow from the at least one gas source to the second anti-siphon portion of the second flow path;
    wherein the first valve when in the open state prevents fluid to siphon from the reservoir to the area through the first flow path; and the second valve when in the open state prevents fluid to siphon from the reservoir to the area through the second flow path.

2. The anti-siphon arrangement of claim 1, wherein at least one of the first and second valves is configured as an electrohydraulic valve.

3. The anti-siphon arrangement of claim 1, wherein at least one of the first and second valves is configured as a check valve, the check valve being arranged to close when a respective at least one of the first and second flow paths is pressurized, and open when the respective at least one of the first and second flow paths is not pressurized.

4. The anti-siphon arrangement of claim 1, wherein the hydraulic system includes a first pump configured to move fluid from the reservoir to the area and a second pump configured to move fluid from the area to the reservoir; and
    wherein the first and second valves are configured to open when the first and second pumps, respectively, are not operating.

5. The anti-siphon arrangement of claim 1, wherein the reservoir is a fluid sump and the area is included in a transmission case for an axle arrangement.

6. A hydraulic manifold to prevent siphoning of fluid from a reservoir, the hydraulic manifold comprising:
    a manifold body configured to be mounted to a wall of the reservoir at least partly above a fluid level of the reservoir;
    a first valved arrangement included at least partly within the manifold body, the first valved arrangement including a first flow path intersection and a first valve configured, when in an open state, to allow gas to flow from at least one gas source to the first intersection;
    wherein the first flow path intersection joins at least a first flow path connected to a first port in the manifold body, a second flow path connected to a second port in the manifold body, and a third flow path that connects the first intersection to the at least one gas source, the first valve configured to block flow along the third flow path when in a closed state; and
    a second valved arrangement included at least partly within the manifold body, the second valved arrangement including a second flow path intersection and a second valve configured, when in an open state, to allow gas to flow from the at least one gas source to the second intersection;
    wherein the second flow path intersection joins at least a fourth flow path connected to a third port in the manifold body, a fifth flow path connected to a fourth port in the manifold body, and a sixth flow path that connects the second intersection to the at least one gas source, the second valve configured to block flow along the sixth flow path when in a closed state;
    wherein a first reservoir flow path connects the reservoir to the first port and a first additional flow path connects the second port to at least one area disposed below the fluid level of the reservoir, and the first valve when in an open state prevents fluid to siphon from the reservoir to the area via the first reservoir flow path; and
    wherein a second reservoir flow path connects the reservoir to the third port and a second additional flow path connects the fourth port to the at least one area, and the second valve when in an open state prevents fluid to siphon from the reservoir to the area via the second reservoir flow path.

7. The hydraulic manifold of claim 6, wherein at least one of the first and second valves is configured as an electrohydraulic valve.

8. The hydraulic manifold of claim 6, wherein the third and sixth flow paths meet at a third intersection included in the manifold body.

9. The hydraulic manifold of claim 6, wherein gas from the at least one gas source flows to the first and second intersections via a common port in the manifold body.

10. The hydraulic manifold of claim 6, further comprising:
- a third valved arrangement included at least partly within the manifold body, the third valved arrangement including:
- a third intersection that joins at least: a seventh flow path connected to a fifth port in the manifold body, an eighth flow path connected to a sixth port in the manifold body, and a ninth flow path that connects the third intersection to the at least one gas source; and
- a third valve arranged to controllably block flow along the ninth flow path, the third valve, when configured in an open state, allowing gas to flow from the at least one gas source into the third intersection;
- wherein a third reservoir flow path connects the reservoir to the fifth port, and a third additional flow path connects the sixth port to the at least one area, and the third valve when in an open state prevents fluid to siphon from the reservoir via the third reservoir flow path.

11. The hydraulic manifold of claim 6, wherein a first pump is configured to pump fluid from the reservoir to the area via, in order, the first flow path and the second flow path.

12. The hydraulic manifold of claim 6, wherein a first pump is configured to pump fluid from the reservoir to the area via, in order, the first flow path and the second flow path;
- further wherein a second pump is configured to pump fluid from the area to the reservoir via, in order, the fourth flow path and the fifth flow path.

13. The hydraulic manifold of claim 6, wherein at least one of the first and second valves is configured as a check valve, the check valve being arranged to close when a respective at least one of the first and second intersections is pressurized by a pump, and to open when the pump is not operating.

14. The hydraulic manifold of claim 13, wherein the check valve is oriented within the manifold body to block fluid flow in an upward direction, when closed.

15. The hydraulic manifold of claim 6, wherein the reservoir is a fluid sump for a transmission of a sprayer vehicle.

16. The hydraulic manifold of claim 15, wherein the area is included in a transmission case for the transmission.

17. A hydraulic system to prevent siphoning of fluid, the hydraulic system comprising:
- a fluid sump;
- a transmission case;
- a charge flow path extending between the fluid sump and the transmission case, the charge flow path having a charge anti-siphon bend extending at least partly above a fluid level of the fluid sump;
- a charge pump configured to pump fluid from the fluid sump to the transmission case via the charge flow path;
- a scavenge flow path extending between the fluid sump and the transmission case, the scavenge flow path having a scavenge anti-siphon bend extending at least partly above the fluid level of the fluid sump;
- a scavenge pump configured to pump fluid from the transmission case to the fluid sump via the scavenge flow path;
- an anti-siphon valve arrangement including a first valve in hydraulic communication with at least one gas source and the charge anti-siphon bend, and a second valve in hydraulic communication with the at least one gas source and the scavenge anti-siphon bend;
- a manifold disposed at an elevation at least partly above the fluid level of the fluid sump, the manifold configured to include the anti-siphon valve arrangement and the charge and scavenge anti-siphon bends;
- a second charge flow path extending between the fluid sump and the transmission case, the second charge flow path having a second charge anti-siphon bend extending at least partly above the fluid level of the fluid sump;
- a second charge pump configured to pump fluid from the fluid sump to the transmission case via the second charge flow path; and
- a third valve included in the anti-siphon valve arrangement, the third valve being in hydraulic communication with the at least one gas source and the second charge anti-siphon bend;
- wherein the first valve is configured, when in an open state, to allow gas to flow from the at least one gas source to the charge anti-siphon bend; and
- wherein the second valve is configured, when in an open state, to allow gas to flow from the at least one gas source to the scavenge anti-siphon bend.

18. The hydraulic system of claim 17, wherein the manifold includes a scavenge return port;
- wherein the manifold is mounted to a wall of the fluid sump such that the scavenge return port directly ports fluid from the manifold into the fluid sump; and
- wherein fluid flowing along the scavenge flow path flows from the manifold into the fluid sump via the scavenge return port.

* * * * *